(12) United States Patent
Sanchez et al.

(10) Patent No.: US 12,267,913 B2
(45) Date of Patent: *Apr. 1, 2025

(54) SYSTEMS AND METHODS FOR VALIDATING A VEHICLE DRIVER BASED ON MOBILE DEVICE POSITIONS WITHIN A VEHICLE

(71) Applicant: QUANATA, LLC, San Francisco, CA (US)

(72) Inventors: Kenneth Jason Sanchez, San Francisco, CA (US); Blake Konrardy, Chicago, IL (US); Tina Fang, San Jose, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,262

(22) Filed: Dec. 29, 2023

(65) Prior Publication Data

US 2024/0137752 A1      Apr. 25, 2024

Related U.S. Application Data

(63) Continuation of application No. 17/673,589, filed on Feb. 16, 2022, now Pat. No. 11,864,268.
(Continued)

(51) Int. Cl.
*H04W 8/22*     (2009.01)
*H04W 4/48*     (2018.01)

(52) U.S. Cl.
CPC ............. *H04W 8/22* (2013.01); *H04W 4/48* (2018.02)

(58) Field of Classification Search
None
See application file for complete search history.

(56) References Cited

U.S. PATENT DOCUMENTS 8,336,664 B2    12/2012  Wallace et al.
9,609,621 B2     3/2017  Osann, Jr.
(Continued)

FOREIGN PATENT DOCUMENTS

CN        102917337 A      2/2013

OTHER PUBLICATIONS

Bo et al., "You're Driving and Texting: Detecting Drivers Using Personal Smart Phones by Leveraging Inertial Sensors" 2013.
(Continued)

*Primary Examiner* — Frantz Bataille
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, cause the one or more processors to perform operations: analyzing telematics data and device interaction data to determine vehicle driving instances in which a user interacts with a mobile device during a vehicle trip for a vehicle; and the device interaction data is generated when the user interacts with the mobile device during the vehicle trip for the vehicle; receiving positioning data associated with one or more positions of the mobile device within the vehicle during the vehicle trip for the vehicle; and identifying whether the user interacting with the mobile device is a driver of the vehicle based at least in part upon the positioning data and the vehicle driving instances. Other embodiments are disclosed.

21 Claims, 6 Drawing Sheets

Related U.S. Application Data

(60) Provisional application No. 63/154,329, filed on Feb. 26, 2021.

(56) References Cited

U.S. PATENT DOCUMENTS

| | | | |
|---|---|---|---|
| 9,846,912 B1 | 12/2017 | Slusar et al. | |
| 10,771,922 B2 | 9/2020 | Lundsgaard et al. | |
| 10,937,105 B1 | 3/2021 | Slusar et al. | |
| 2012/0214463 A1* | 8/2012 | Smith | H04W 4/50 |
| | | | 455/26.1 |
| 2015/0243165 A1* | 8/2015 | Elsheemy | G08G 1/096775 |
| | | | 340/906 |
| 2019/0052747 A1* | 2/2019 | Breaux | H04M 1/72454 |

OTHER PUBLICATIONS

Johnson et al., "Smartphone localization inside a moving car for prevention of distracted driving," Vehicle System Dynamics, vol. 58, No. 2, pp. 290-306 2020.

* cited by examiner

SYSTEMS AND METHODS FOR VALIDATING A VEHICLE DRIVER BASED ON MOBILE DEVICE POSITIONS WITHIN A VEHICLE

CROSS-REFERENCE TO RELATED APPLICATIONS

This application is a Continuation Application of U.S. patent application Ser. No. 17/673,589, filed on Feb. 16, 2022, to be issued as U.S. patent application No. 11,864,268, which claims priority to U.S. Provisional Patent Application No. 63/154,329, filed Feb. 26, 2021. U.S. patent application Ser. No. 17/673,589 and U.S. Provisional Patent Application No. 63/154,329 are herewith incorporated by reference in their entirety.

The following four applications, including this one, are being filed concurrently and the other three are hereby incorporated by reference in their entirety for all purposes:
1. U.S. patent application Ser. No. 17/673,560, titled "Systems and Methods for Determining a Vehicle Driver Based on Mobile Device Usage During High Attention Driving Events";
2. U.S. patent application Ser. No. 17/673,571, titled "Systems and Methods for Determining a Vehicle Driver Based on Mobile Device Usage During Low Attention Driving Events";
3. U.S. patent application Ser. No. 17/673,578, titled "Systems and Methods for Determining Which Mobile Device Among Multiple Mobile Devices is Used by a Vehicle Driver"; and
4. U.S. patent application Ser. No. 17/673,589, titled "Systems and Methods for Validating a Vehicle Driver Based on Mobile Device Positions Within a Vehicle".

FIELD OF THE DISCLOSURE

Some embodiments of the present disclosure are directed to determining and validating a driver within a vehicle. More particularly, certain embodiments of the present disclosure provide methods and systems for determining which vehicle occupant is using a mobile device of the driver in view of positioning data of the mobile device within the vehicle. Merely by way of example, the present disclosure has been applied to verifying whether the vehicle occupant using the mobile device is the driver in order to accurately attribute driving behaviors to the driver. But it would be recognized that the present disclosure has much broader range of applicability.

BACKGROUND OF THE DISCLOSURE

A driver's driving behavior during a vehicle trip can be monitored for insurance related purposes. For example, various data generated by a mobile device of the driver are collected and analyzed to determine whether the driver was practicing safe driving. When the driver is accompanied by one or more passengers during the vehicle trip, a problem arises when a passenger uses or interacts with the driver's mobile device. Conventional systems would attribute the passenger's interactions to the driver and thus classify the driver as being distracted while driving. This misclassification can negatively impact the driver's insurance ratings. Accordingly, there exists a need to determine whether the driver or the passenger is using the mobile device during the vehicle trip so that data collected from the mobile device can be used to accurately assess the driver's driving behavior and not have any of the passenger's behavior imparted onto the driver.

BRIEF SUMMARY OF THE DISCLOSURE

Some embodiments of the present disclosure are directed to determining and validating a driver within a vehicle. More particularly, certain embodiments of the present disclosure provide methods and systems for determining which vehicle occupant is using a mobile device of the driver in view of positioning data of the mobile device within the vehicle. Merely by way of example, the present disclosure has been applied to verifying whether the vehicle occupant using the mobile device is the driver in order to accurately attribute driving behaviors to the driver. But it would be recognized that the present disclosure has much broader range of applicability.

According to certain embodiments, a method for validating whether or not a user of a mobile device is a driver of a vehicle includes receiving telematics data and device interaction data generated by the mobile device during a vehicle trip. Also, the method includes analyzing the telematics data and the device interaction data to determine a plurality of driving instances in which the user interacts with the mobile device during the vehicle trip. By using a classification technique, the method includes determining whether or not the user of the mobile device is the driver of the vehicle during the vehicle trip based at least in part upon the plurality of driving instances. Additionally, the method includes receiving positioning data associated with the mobile device within the vehicle during the vehicle trip. Moreover, the method includes validating the classification technique based at least in part upon the positioning data associated with the mobile device within the vehicle and whether or not the user of the mobile device is determined to be the driver of the vehicle.

According to some embodiments, a computing device for validating whether or not a user of a mobile device is a driver of a vehicle includes one or more processors and a memory storing instructions for execution by the one or more processors. The instructions, when executed, cause the one or more processors to receive telematics data and device interaction data generated by the mobile device during a vehicle trip. Also, the instructions, when executed, cause the one or more processors to analyze the telematics data and the device interaction data to determine a plurality of driving instances in which the user interacts with the mobile device during the vehicle trip. Additionally, the instructions, when executed, cause the one or more processors to use a classification technique to determine whether or not the user of the mobile device is the driver of the vehicle during the vehicle trip based at least in part upon the plurality of driving instances. Further, the instructions, when executed, cause the one or more processors to receive positioning data associated with the mobile device within the vehicle during the vehicle trip. Moreover, the instructions, when executed, cause the one or more processors to validate the classification technique based at least in part upon the positioning data associated with the mobile device within the vehicle and whether or not the user of the mobile device is determined to be the driver of the vehicle.

According to certain embodiments, a non-transitory computer-readable medium storing instructions for validating whether or not a user of a mobile device is a driver of a vehicle. The instructions are executed by one or more processors of a computing device. The non-transitory computer-readable medium includes instructions to receive telematics data and device interaction data generated by the mobile device during a vehicle trip. Also, the non-transitory computer-readable medium includes instructions to analyze the telematics data and the device interaction data to determine a plurality of driving instances in which the user interacts with the mobile device during the vehicle trip. Additionally, the non-transitory computer-readable medium includes instructions to use a classification technique to determine whether or not the user of the mobile device is the driver of the vehicle during the vehicle trip based at least in part upon the plurality of driving instances. Further, the non-transitory computer-readable medium includes instructions to receive positioning data associated with the mobile device within the vehicle during the vehicle trip. Moreover, the non-transitory computer-readable medium includes instructions to validate the classification technique based at least in part upon the positioning data associated with the mobile device within the vehicle and whether or not the user of the mobile device is determined to be the driver of the vehicle.

Various embodiments can include a system including one or more processors and one or more non-transitory computer-readable media storing computing instructions that, when executed on the one or more processors, cause the one or more processors to perform certain acts. The acts can include analyzing telematics data and device interaction data to determine vehicle driving instances in which a user interacts with a mobile device during a vehicle trip for a vehicle. The telematics data can be generated during the vehicle trip for the vehicle. The device interaction data can be generated when the user interacts with the mobile device during the vehicle trip for the vehicle. The acts also can include receiving positioning data associated with one or more positions of the mobile device within the vehicle during the vehicle trip for the vehicle. The acts additionally can include identifying whether the user interacting with the mobile device is a driver of the vehicle based at least in part upon the positioning data and the vehicle driving instances.

A number of embodiments can include a computer-implemented method for validating whether or not a user of a mobile device is a driver of a vehicle. The computer-implemented method can include analyzing telematics data and device interaction data to determine vehicle driving instances in which a user interacts with a mobile device during a vehicle trip for a vehicle. The telematics data can be generated during the vehicle trip for the vehicle. The device interaction data can be generated when the user interacts with the mobile device during the vehicle trip for the vehicle. The computer-implemented method also can include receiving positioning data associated with one or more positions of the mobile device within the vehicle during the vehicle trip for the vehicle. The computer-implemented method additionally can include identifying whether the user interacting with the mobile device is a driver of the vehicle based at least in part upon the positioning data and the vehicle driving instances.

Several embodiments can include one or more non-transitory computer-readable media storing computing instructions that, when executed by one or more processors, cause the one or more processors to perform operations. The one or more non-transitory computer-readable media can include analyzing telematics data and device interaction data to determine vehicle driving instances in which a user interacts with a mobile device during a vehicle trip for a vehicle. The telematics data can be generated during the vehicle trip for the vehicle. The device interaction data can be generated when the user interacts with the mobile device during the vehicle trip for the vehicle. The one or more non-transitory computer-readable media also can include receiving positioning data associated with one or more positions of the mobile device within the vehicle during the vehicle trip for the vehicle. The one or more non-transitory computer-readable media additionally can include identifying whether the user interacting with the mobile device is a driver of the vehicle based at least in part upon the positioning data and the vehicle driving instances.

Various embodiments can include a system including a means for analyzing telematics data and device interaction data to determine vehicle driving instances in which a user interacts with a mobile device during a vehicle trip for a vehicle. The telematics data can be generated during the vehicle trip for the vehicle. The device interaction data can be generated when the user interacts with the mobile device during the vehicle trip for the vehicle. The system also can include a means for receiving positioning data associated with one or more positions of the mobile device within the vehicle during the vehicle trip for the vehicle. The system further can include a means for identifying whether the user interacting with the mobile device is a driver of the vehicle based at least in part upon the positioning data and the vehicle driving instances.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to determining and validating a driver within a vehicle. More particularly, certain embodiments of the present disclosure provide methods and systems for determining which vehicle occupant is using a mobile device of the driver in view of positioning data of the mobile device within the vehicle. Merely by way of example, the present disclosure has been applied to verifying whether the vehicle occupant using the mobile device is the driver in order to accurately attribute driving behaviors to the driver. But it would be recognized that the present disclosure has much broader range of applicability.

Figure 1:
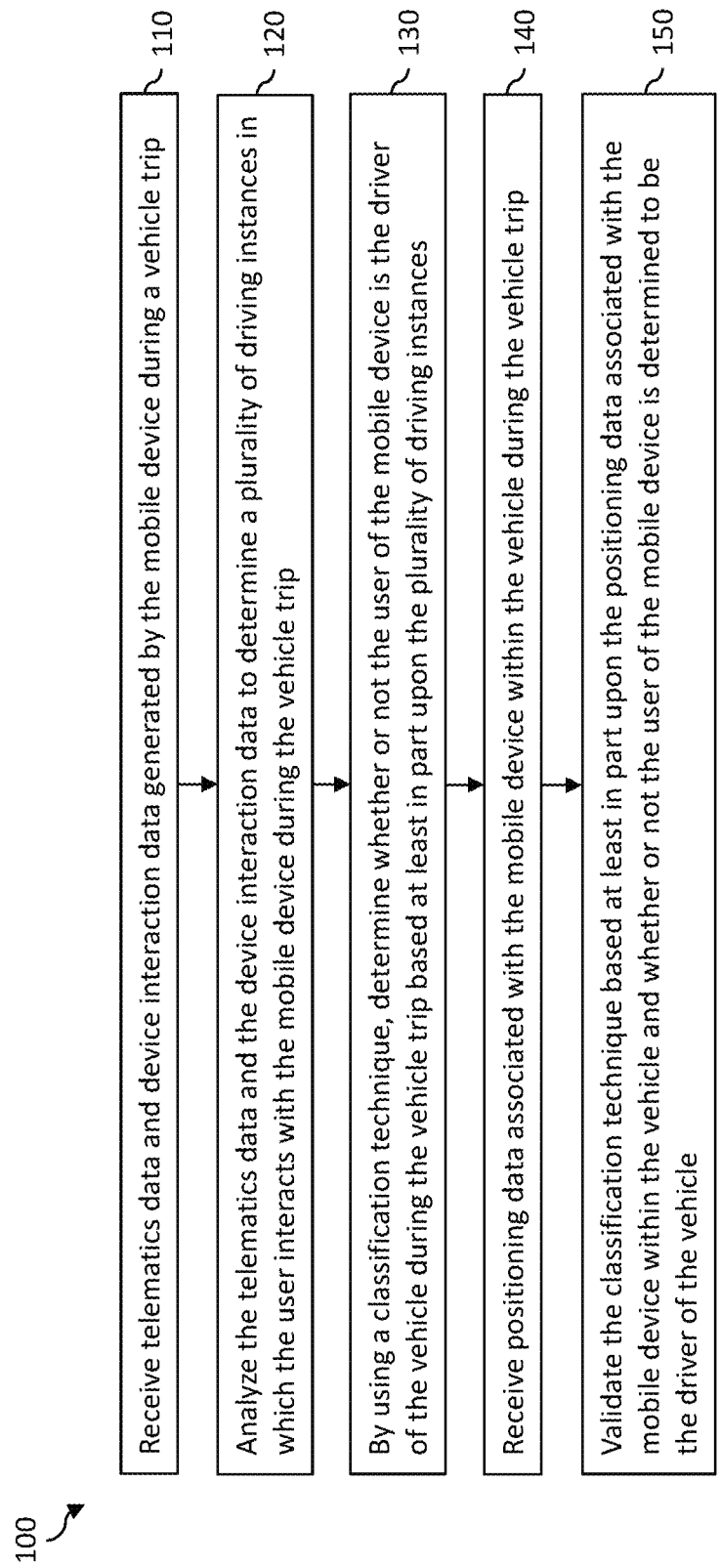
FIG. 1 shows a simplified method for validating a vehicle driver based on mobile device positions within a vehicle according to certain embodiments of the present disclosure.

I. One or More Methods for Validating a Vehicle Driver Based on Mobile Device Positions within a Vehicle According to Certain Embodiments FIG. 1 shows a simplified method for validating a vehicle driver based on mobile device positions within a vehicle according to certain embodiments of the present disclosure. This figure is merely an example, which should not unduly limit the scope of the claims. One of ordinary skill in the art would recognize many variations, alternatives, and modifications. The method 100 includes process 110 for receiving telematics data and device interaction data, process 120 for analyzing the telematics data and the device interaction data, process 130 for using a classification technique to determine whether a user is a driver, process 140 for receiving positioning data, and process 150 for validating the classification technique. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, the telematics data and the device interaction data generated by a mobile device during a vehicle trip are received according to certain embodiments. In various embodiments, the telematics data and/or the device interaction data are collected by one or more sensors (e.g., accelerometers, gyroscopes, magnetometers, location sensors (e.g., GPS sensors), cameras, gaze sensors, etc.) in the mobile device.

In certain embodiments, the vehicle trip is made by the driver of the vehicle. For example, the vehicle trip is made by the driver to commute to and from work. As an example, the vehicle trip is made by the driver in running errands (e.g., grocery shopping, visiting a hospital, picking up kids from school, etc.). For example, the vehicle trip is made by the driver for any suitable personal and/or business reasons (e.g., city travels, business trips, family vacations, etc.).

At the process 120, the telematics data and the device interaction data are analyzed to determine a plurality of driving instances in which the user interacts with the mobile device during the vehicle trip according to certain embodiments. In some embodiments, the plurality of driving instances in which the user interacts with the mobile device indicate usage of the mobile device during various driving events, such as high attention driving events (e.g., changing lanes, making turns, passing another vehicle, transiting through a roundabout, etc.) and/or low attention driving events (e.g., idling, cruising on an open highway, stopping, driving in light traffic, etc.).

In certain embodiments, the plurality of driving instances in which the user interacts with the mobile device are determined by correlating the telematics data and the device interaction data. For example, the telematics data may show that the vehicle is making lane changes while the device interaction data may show that the user is texting on the mobile device at the same time. As an example, correlation of the telematics data and the device interaction data will indicate that the user was interacting with the mobile device during a lane change maneuver. For example, the telematics data may show that the vehicle is completing a left turn while the device interaction data may show that the user is dialing a phone number on the mobile device at the same time. As an example, correlation of the telematics data and the device interaction data will indicate that the user was interacting with the mobile device during a left turn maneuver. For example, the telematics data may show that the vehicle is cruising on a straight road while the device interaction data may show that the user is responding to an email on the mobile device at the same time. As an example, correlation of the telematics data and the device interaction data will indicate that the user was interacting with the mobile device during steady vehicle travel. For example, the telematics data may show that the vehicle is moving at a slow speed while the device interaction data may show that the user is taking a picture with the mobile device at the same time. As an example, correlation of the telematics data and the device interaction data will indicate that the user was interacting with the mobile device during low-speed driving.

At the process 130, whether or not the user of the mobile device is the driver of the vehicle during the vehicle trip is determined based at least in part upon the plurality of driving instances by using the classification technique according to certain embodiments. In various embodiments, the classification technique determines whether the user is the driver by classifying each of the plurality of driving instances involving user interactions associated with the mobile device.

In some embodiments, the classification technique analyzes usage of the mobile device during high attention driving events. For example, the classification technique is implemented according to at least FIG. 2. In certain embodiments, the classification technique analyzes usage of the mobile device during low attention driving events. For example, the classification technique is implemented according to at least FIG. 3. In some embodiments, the classification technique is based upon various machine learning methods, such as supervised machine learning (e.g., linear regression, decision trees, etc.), semi-supervised machine learning (e.g., variational autoencoders), and/or unsupervised machine learning (e.g., autoencoders, self-organizing maps, etc.).

At the process 140, the positioning data associated with the mobile device within the vehicle during the vehicle trip are received according to certain embodiments. In various embodiments, the positioning data indicate a location of the mobile device within the vehicle. In some embodiments, the positioning data are analyzed or processed to determine if the user of the mobile device is situated in a driver seat position of the vehicle during the vehicle trip. For example, processing of the positioning data is implemented according to at least FIG. 4.

At the process 150, the classification technique is validated based at least in part upon the positioning data associated with the mobile device within the vehicle and whether or not the first user has been determined to be the driver of the vehicle according to certain embodiments. In various embodiments, the classification technique is validated in view of the positioning data to determine the accuracy of the classification technique.

In some embodiments, if the user of the mobile device is determined to be driver of the vehicle, validating the classification technique involves verifying that the user of the mobile device is in the driver seat position of the vehicle during the vehicle trip according to the positioning data. For example, if the positioning data show that the mobile device was in a driver seat of the vehicle during the vehicle trip, then user interactions of the mobile device can be attributed to the driver.

In certain embodiments, if the user of the mobile device is determined not to be driver of the vehicle, validating the classification technique involves verifying that the user of the mobile device is not in the driver seat position of the vehicle during the vehicle trip according to the positioning data. For example, if the positioning data show that the mobile device was in a rear seat of the vehicle during the vehicle trip, then it is impossible to attribute any user interactions of the mobile device to the driver.

Figure 2:
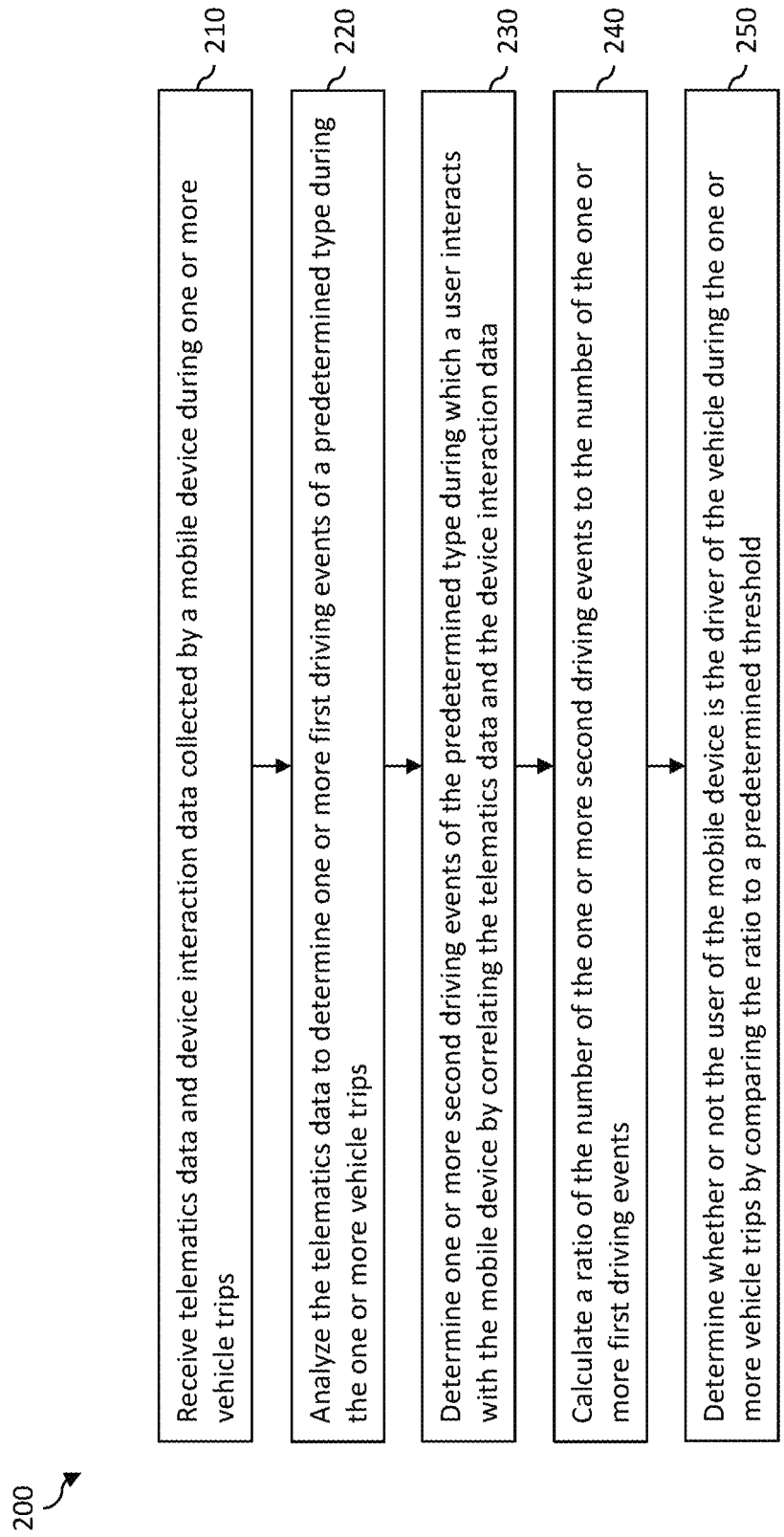
FIG. 2 shows a simplified method for determining whether a user of a mobile device is a vehicle driver according to certain embodiments of the present disclosure.

FIG. 2 shows a simplified method for determining whether a user of a mobile device is a driver of a vehicle according to certain embodiments of the present disclosure. This figure is merely an example, which should not unduly limit the scope of the claims. One of ordinary skill in the art would recognize many variations, alternatives, and modifications. The method 200 includes process 210 for receiving telematics data and device interaction data, process 220 for determining first driving events, process 230 for determining second driving events, process 240 for calculating a ratio based upon the first driving events and the second driving events, and process 250 for determining whether the user of the mobile device is the driver of the vehicle. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium. According to some embodiments, the method 200 is an implementation of the classification technique in the method 100 of FIG. 1.

At the process 210, the telematics data and the device interaction data are collected by the mobile device (e.g., first mobile device, second mobile device) during one or more vehicle trips according to certain embodiments. In some embodiments, the telematics data indicate driving maneuvers made during the one or more vehicle trips (e.g., braking, acceleration, cornering, stopping, etc.). In certain embodiments, the device interaction data indicate user interactions with the mobile device during the one or more vehicle trips (e.g., texting, making a phone call, interacting with an application on the mobile device, etc.). In various embodiments, the telematics data and/or the device interaction data are collected by one or more sensors in the mobile device.

At the process 220, the telematics data are analyzed to determine one or more first driving events of a predetermined type during the one or more vehicle trips according to certain embodiments. In various embodiments, the one or more first driving events of the predetermined type correspond to high attention driving events that require a high level of mental focus or alertness when operating the vehicle (e.g., entering/exiting a highway ramp). In some embodiments, in addition to the telematics data, vehicle environment data (e.g., location data, traffic data, weather data, etc.) collected or received by the mobile device are analyzed to determine the one or more first driving events.

At the process 230, one or more second driving events of the predetermined type during which the user interacts with the mobile device are determined according to certain embodiments. In various embodiments, the one or more second driving events indicate mobile device usage during the high attention driving events.

In some embodiments, the one or more second driving events of the predetermined type are determined by correlating the telematics data and the device interaction data. For example, the telematics data may show that the vehicle is traveling on a highway on-ramp while the device interaction data may show that the user is swiping on a screen of the mobile device at the same time. As an example, correlation of the telematics data and the device interaction data will indicate that the user was interacting with the mobile device while a highway entrance was taking place.

In certain embodiments, the one or more second driving events of the predetermined type are determined by correlating the telematics data, the device interaction data, and the vehicle environment data. For example, the telematics data and the vehicle environment data may show that the vehicle is traveling in a congested urban area while the device interaction data may show that the user is constantly viewing the mobile device at the same time. As an example, correlation of the telematics data, the device interaction data, and the vehicle environment data will indicate that the user was interacting with the mobile device while engaged in stop and go traffic.

At the process 240, a ratio of the number of the one or more second driving events to the number of the one or more first driving events is calculated according to certain embodiments. In various embodiments, the ratio compares the number of high attention driving events in which mobile device usage was detected to the total number of high attention driving events. At the process 250, whether or not the user of the mobile device is the driver of the vehicle during the one or more vehicle trips is determined by comparing the ratio to a predetermined threshold according to certain embodiments.

In some embodiments, if the ratio is less than the predetermined threshold, the user of the mobile device is determined to be the driver of the vehicle during the one or more vehicle trips. For example, the user of the mobile device is attributed to the driver of the vehicle because mobile device usage during the high attention driving events was relatively low when compared to the total number of high attention driving events.

In certain embodiments, if the ratio is greater than the predetermined threshold, the user of the mobile device is determined not to be the driver of the vehicle during the one or more vehicle trips. For example, the user of the mobile device is not attributed to the driver of the vehicle because mobile device usage during the high attention driving events was relatively high when compared to the total number of high attention driving events. As an example, the user of the mobile device can be attributed to another individual (e.g., a passenger) in the vehicle.

Figure 3:
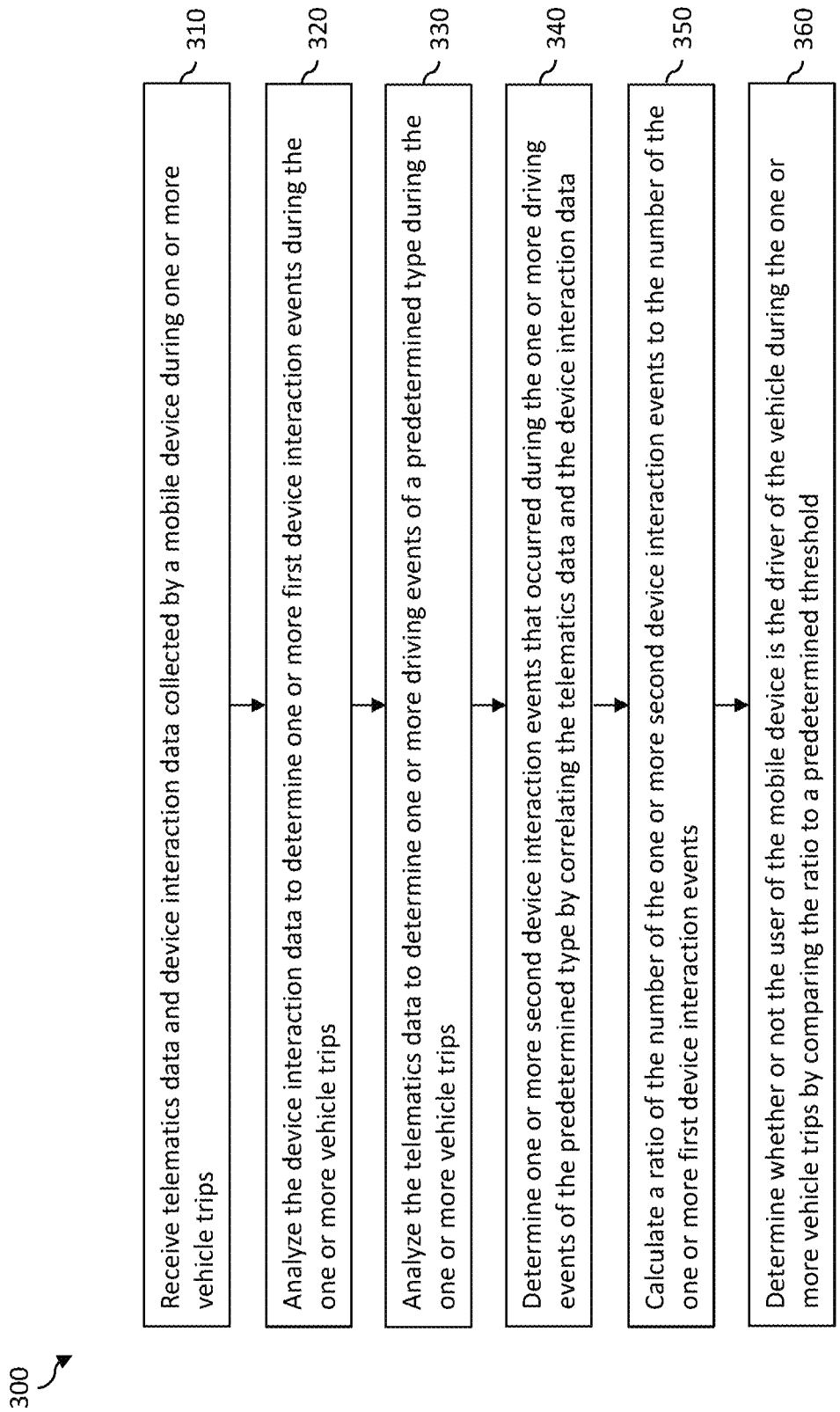
FIG. 3 shows a simplified method for determining whether a user of a mobile device is a vehicle driver according to some embodiments of the present disclosure.

FIG. 3 shows a simplified method for determining whether a user of a mobile device is a driver of a vehicle according to some embodiments of the present disclosure. This figure is merely an example, which should not unduly limit the scope of the claims. One of ordinary skill in the art would recognize many variations, alternatives, and modifications. The method 300 includes process 310 for receiving telematics data and device interaction data, process 320 for determining first device interaction events, process 330 for determining driving events, process 340 for determining second device interaction events, process 350 for calculating a ratio based upon the first device interaction events and the second device interaction events, and process 360 for determining whether the user of the mobile device is the driver of the vehicle. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium. According to certain embodiments, the method 300 is an implementation of the classification technique in the method 100 of FIG. 1.

At the process 310, the telematics data and the device interaction data are collected by the mobile device during one or more vehicle trips according to some embodiments. In various embodiments, the telematics data and/or the device interaction data are collected by one or more sensors in the mobile device.

At the process 320, the device interaction data are analyzed to determine one or more first device interaction events during the one or more vehicle trips according to certain embodiments. In some embodiments, the one or more first device interaction events indicate user interactions with the mobile device during the one or more vehicle trips (e.g., turning the mobile device on/off, moving the mobile device, viewing the mobile device, etc.).

At the process 330, the telematics data are analyzed to determine one or more driving events of a predetermined type during the one or more vehicle trips according to certain embodiments. In various embodiments, the one or more driving events of the predetermined type correspond to low attention driving that require a low level of mental focus or alertness when operating the vehicle (e.g., driving with no traffic). In some embodiments, in addition to the telematics data, vehicle environment data (e.g., location data, traffic data, weather data, etc.) collected or received by the mobile device are analyzed to determine the one or more driving events.

At the process 340, one or more second device interaction events that occurred during the one or more driving events of the predetermined type are determined according to certain embodiments. In various embodiments, the one or more second device interaction events indicate mobile device usage during the low attention driving events.

In some embodiments, the one or more second device interaction events are determined by correlating the telematics data and the device interaction data. For example, the device interaction data may show that the user is typing into the mobile device while the telematics data may show that the vehicle is idling at the same time. As an example, correlation of the telematics data and the device interaction data will indicate that mobile device usage occurred while the vehicle was not in motion.

In certain embodiments, the one or more second device interaction events that occurred during the one or more driving events of the predetermined type are determined by correlating the telematics data, the device interaction data, and the vehicle environment data. For example, the device interaction data may show that the user is moving the mobile device from one location to another while the telematics data and the vehicle environment data may show that the vehicle is traveling in a rural area at the same time. As an example, correlation of the telematics data, the device interaction data, and the vehicle environment data will indicate that mobile device usage occurred while the vehicle was engaged in open road travel.

At the process 350, a ratio of the number of the one or more second device interaction events to the number of the one or more first device interaction events is calculated according to certain embodiments. In various embodiments, the ratio compares the number of mobile device usages that occurred during low attention driving events to the total number of low attention driving events. At the process 360, whether or not the user of the mobile device is the driver of the vehicle during the one or more vehicle trip segments is determined by comparing the ratio to a predetermined threshold according to certain embodiments.

In some embodiments, if the ratio is less than the predetermined threshold, the user of the mobile device is determined not to be the driver of the vehicle during the one or more vehicle trip segments. For example, the user of the mobile device is not attributed to the driver of the vehicle because mobile device usage during the low attention driving events was relatively low when compared to the total number of low attention driving events. As an example, the user of the mobile device will be attributed to another individual (e.g., a passenger) in the vehicle.

In certain embodiments, if the ratio is greater than the predetermined threshold, the user of the mobile device is determined to be the driver of the vehicle during the one or more vehicle trip segments. For example, the user of the mobile device is attributed to the driver of the vehicle because mobile device usage during the low attention driving events was relatively high when compared to the total number of low attention driving events. As an example, the driver can afford to interact with the mobile device because the chances of becoming distracted during the low attention driving events are small.

Figure 4:
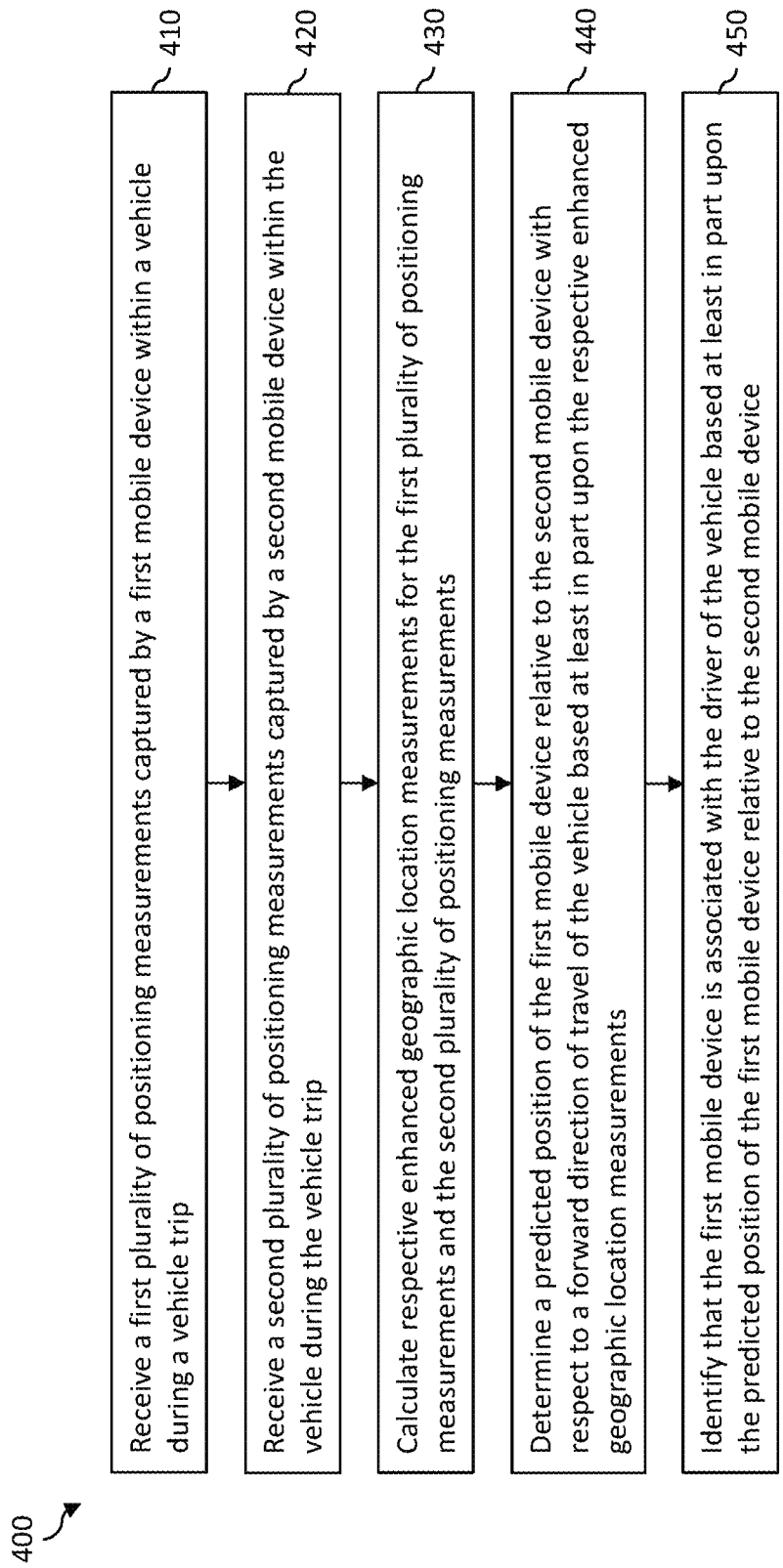
FIG. 4 shows a simplified method for determining a vehicle driver using positioning data of a mobile device within a vehicle according to certain embodiments of the present disclosure.

FIG. 4 shows a simplified method for determining a vehicle driver using positioning data of a mobile device within a vehicle according to certain embodiments of the present disclosure. This figure is merely an example, which should not unduly limit the scope of the claims. One of ordinary skill in the art would recognize many variations, alternatives, and modifications. The method 400 includes process 410 for receiving a first plurality of positioning measurements, process 420 for receiving a second plurality of positioning measurements, process 430 for calculating respective enhanced geographic location measurements, process 440 for determining a predicted position, and process 450 for identifying a driver based on the predicted position. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium. According to certain embodiments, the method 400 is an implementation of processing the positioning data associated the mobile device in the method 100 of FIG. 1.

At the process 410, the first plurality of positioning measurements captured by a first mobile device within a vehicle during a vehicle trip are received according to certain embodiments. In various embodiments, the first mobile device corresponds to the mobile device of FIG. 1. In some embodiments, each of the first plurality of positioning measurements includes a measured geographic location and an error estimate. In certain embodiments, the first plurality of positioning measurements are captured by one or more sensors (e.g., GPS sensors, accelerometers, gyroscopes, etc.) in the first mobile device.

At the process 420, the second plurality of positioning measurements captured by a second mobile device within the vehicle during the vehicle trip are received according to certain embodiments. In some embodiments, each of the second plurality of measurements includes a measured geographic location and an error estimate. In certain embodiments, the second plurality of positioning measurements are captured by one or more sensors (e.g., GPS sensors, accelerometers, gyroscopes, etc.) in the second mobile device.

At the process 430, the respective enhanced geographic location measurements for the first plurality of positioning measurements and the second plurality of positioning measurements are calculated according to certain embodiments. In some embodiments, the respective enhanced geographic location measurements are calculated based on the measured geographic location and the error estimate corresponding to each of the first plurality of positioning measurements and the second plurality of positioning measurements.

In certain embodiments, the respective enhanced geographic location measurements are calculated using a Kalman filter. For example, the Kalman filter determines an estimated geographic location measurement for a current geographic location measurement based on a previous geographic location measurement. As an example, the Kalman filter calculates the estimated geographic location measurement by integrating an acceleration value associated with the previous geographic location measurement over a period of time between measurements to determine a displacement estimate from the previous geographic location measurement. For example, the Kalman filter adds the displacement estimate to the previous geographic location measurement to determine the estimated geographic location measurement. As an example, the Kalman filter calculates an enhanced geographic location measurement by taking a weighted average of the current geographic location measurement and the estimated geographic location measurement. For example, the weights assigned to the current and the estimated geographic location measurements are based on a predicted error of the current and the estimated geographic location measurements where a lesser predicted error corresponds to a greater weight.

At the process 440, the predicted position of the first mobile device relative to the second mobile device with respect to a forward direction of travel of the vehicle based at least in part upon the respective enhanced geographic location measurements are determined according to certain embodiments. For example, the first mobile device and the second mobile device may be determined to have the same forward direction of travel with the relative positions of the first mobile device and the second mobile device being constant with respect to the forward direction of travel. As an example, the respective enhanced geographic location measurements may indicate that the first mobile device is on average to the left of the second mobile device with respect to the direction of forward movement of the vehicle.

In some embodiments, other sensor data (e.g., acceleration data measured by an accelerometer and/or gyroscope) can be used to determine the predicted position of the first mobile device relative to the second mobile device. For example, assume that the first mobile device is a left position (e.g., driver seat) and the second mobile device is in a right position (e.g., front passenger seat). As an example, if the vehicle makes a right turn, the first mobile device has a longer turning radius than the second mobile device. For example, the first mobile device will experience a greater angular acceleration than the second mobile device as a result of the right turn of the vehicle. As an example, the angular acceleration can be used to determine that the first mobile device is to the left of the second mobile device with respect to the direction of forward movement of the vehicle. For example, assume the first mobile device is in a front position and the second mobile device is in a rear position. As an example, if a degree of incline at which the vehicle is moving changes (e.g., vehicle begins to move up or down a hill), the first mobile device will experience a change in vertical acceleration before the second mobile device. For example, a delay in the vertical acceleration of the first mobile device and the second mobile device can be used to determine that the first mobile device is a certain distance in front of the second mobile device with respect to the direction of forward movement of the vehicle.

At the process 450, the driver of the vehicle is identified to be associated with the first mobile device based at least in part upon the predicted position of the first mobile device relative to the second mobile device according to certain embodiments. In various embodiments, a map is generated indicating the position of the first mobile device with respect to the second mobile device within the vehicle based on the predicted position of the first mobile device relative to the second mobile device. For example, the map is analyzed to determine that the first mobile device is situated in a driver seat position of the vehicle during the vehicle trip.

Figure 5:
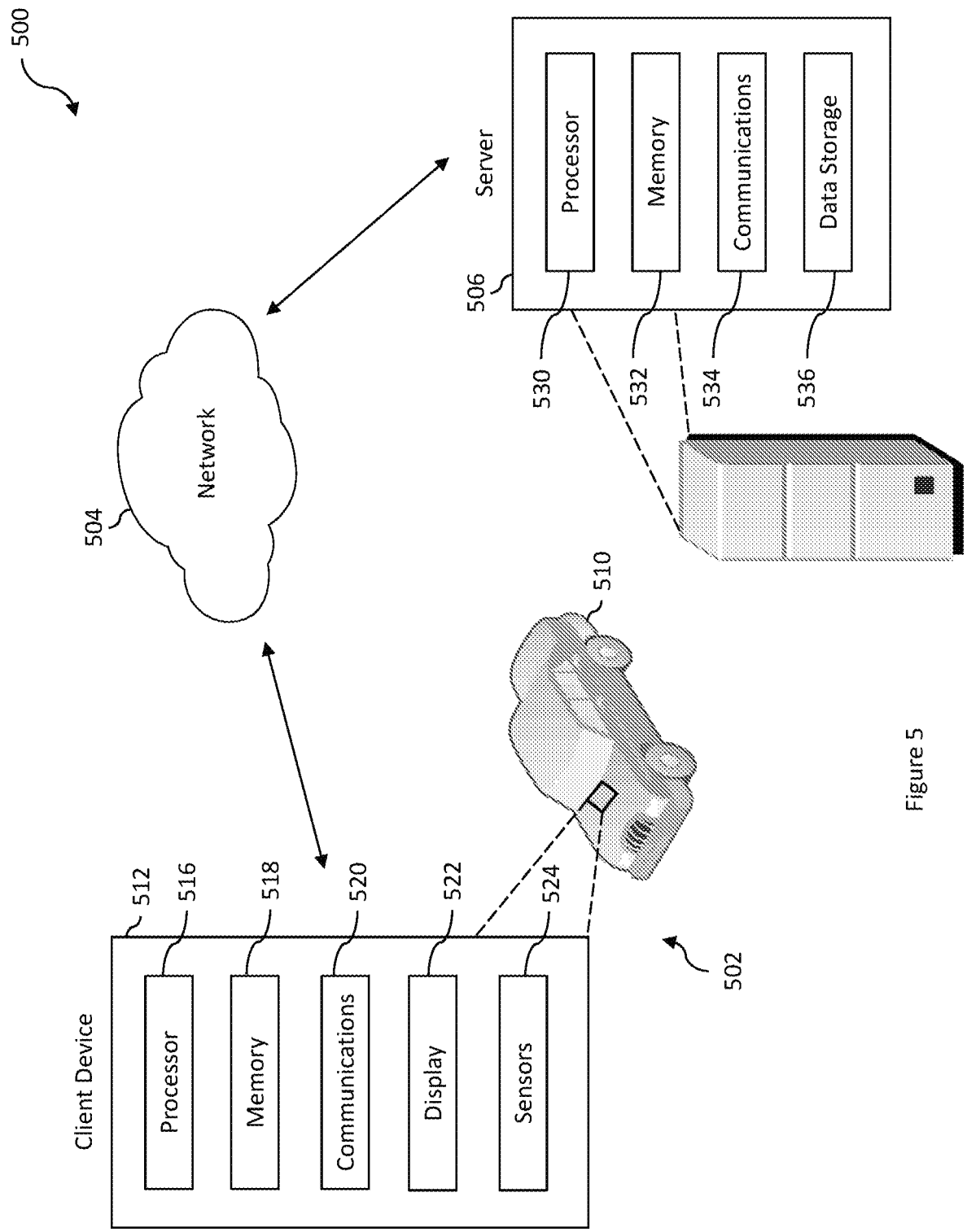
FIG. 5 shows a simplified system for validating a vehicle driver based on mobile device positions within a vehicle according to certain embodiments of the present disclosure.

II. One or More Systems for Validating a Vehicle Driver Based on Mobile Device Positions within a Vehicle According to Certain Embodiments FIG. 5 shows a simplified system for validating a vehicle driver based on mobile device positions within a vehicle according to certain embodiments of the present disclosure. This figure is merely an example, which should not unduly limit the scope of the claims. One of ordinary skill in the art would recognize many variations, alternatives, and modifications. The system 500 includes a vehicle system 502, a network 504, and a server 506. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 500 is used to implement the method 100, the method 200, the method 300, and/or the method 400. According to certain embodiments, the vehicle system 502 includes a vehicle 510 and a client device 512 associated with the vehicle 510. For example, the client device 512 is a mobile device (e.g., a smartphone) located in the vehicle 510. For example, the client device 512 includes a processor 516 (e.g., a central processing unit (CPU), a graphics processing unit (GPU)), a memory 518 (e.g., random-access memory (RAM), read-only memory (ROM), flash memory), a communications unit 520 (e.g., a network transceiver), a display unit 522 (e.g., a touchscreen), and one or more sensors 524 (e.g., an accelerometer, a gyroscope, a magnetometer, a barometer, a GPS sensor).

In some embodiments, the vehicle 510 is operated by a driver. In certain embodiments, multiple vehicles 510 exist in the system 500 which are operated by respective drivers. In various embodiments, during one or more vehicle trips, the one or more sensors 524 collect data associated with vehicle operation, such as acceleration, braking, location, etc. According to some embodiments, the data are collected continuously, at predetermined time intervals, and/or based on a triggering event (e.g., when each sensor has acquired a threshold amount of sensor measurements). In various embodiments, the collected data represent the telematics data and/or the device interaction data in the method 100, the method 200, the method 300, and/or the method 400.

According to certain embodiments, the collected data are stored in the memory 518 before being transmitted to the server 506 using the communications unit 520 via the network 504 (e.g., via a local area network (LAN), a wide area network (WAN), the Internet). In some embodiments, the collected data are transmitted directly to the server 506 via the network 504. For example, the collected data are transmitted to the server 506 without being stored in the memory 518. In certain embodiments, the collected data are transmitted to the server 506 via a third party. For example, a data monitoring system stores any and all data collected by the one or more sensors 524 and transmits those data to the server 506 via the network 504 or a different network.

According to some embodiments, the server 506 includes a processor 530 (e.g., a microprocessor, a microcontroller), a memory 532, a communications unit 534 (e.g., a network transceiver), and a data storage 536 (e.g., one or more databases). In some embodiments, the server 506 is a single server, while in certain embodiments, the server 506 includes a plurality of servers with distributed processing. In FIG. 5, the data storage 536 is shown to be part of the server 506. In certain embodiments, the data storage 536 is a separate entity coupled to the server 506 via a network such as the network 504. In some embodiments, the server 506 includes various software applications stored in the memory 532 and executable by the processor 530. For example, these software applications include specific programs, routines, or scripts for performing functions associated with the method 100, the method 200, the method 300, and/or the method 400. As an example, the software applications include general-purpose software applications for data processing, network communication, database management, web server operation, and/or other functions typically performed by a server.

According to various embodiments, the server 506 receives, via the network 504, the data collected by the one or more sensors 524 using the communications unit 534 and stores the data in the data storage 536. For example, the server 506 then processes the data to perform one or more processes of the method 100, one or more processes of the method 200, one or more processes of the method 300, and/or one or more processes of the method 400.

According to certain embodiments, any related information determined or generated by the method 100, the method 200, the method 300, and/or the method 400 (e.g., plurality of driving instances, first driving events, second driving events, first device interaction events, second device interaction events, enhanced geographic location measurements, etc.) are transmitted back to the client device 512, via the network 504, to be provided (e.g., displayed) to the user via the display unit 522.

In some embodiments, one or more processes of the method 100, one or more processes of the method 200, one or more processes of the method 300, and/or one or more processes of the method 400 are performed by the client device 512. For example, the processor 516 of the client device 512 processes the data collected by the one or more sensors 524 to perform one or more processes of the method 100, one or more processes of the method 200, one or more processes of the method 300, and/or one or more processes of the method 400.

Figure 6:
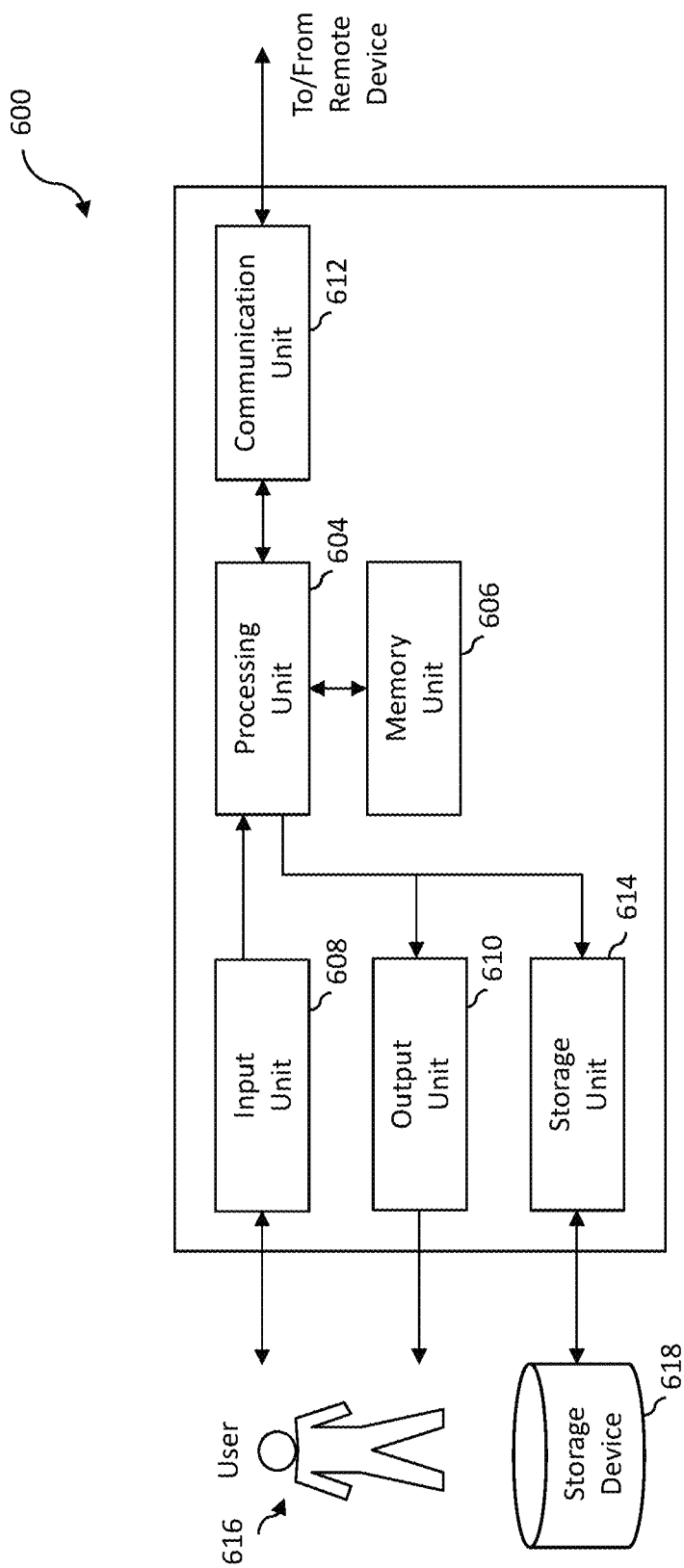
FIG. 6 shows a simplified computing device for validating a vehicle driver based on mobile device positions within a vehicle according to certain embodiments of the present disclosure.

III. One or More Computing Devices for Validating a Vehicle Driver Based on Mobile Device Positions within a Vehicle According to Certain Embodiments FIG. 6 shows a simplified computing device for validating a vehicle driver based on mobile device positions within a vehicle according to certain embodiments of the present disclosure. This figure is merely an example, which should not unduly limit the scope of the claims. One of ordinary skill in the art would recognize many variations, alternatives, and modifications. The computing device 600 includes a processing unit 604, a memory unit 606, an input unit 608, an output unit 610, a communication unit 612, and a storage unit 614. In various embodiments, the computing device 600 is configured to be in communication with a user 616 and/or a storage device 618. In certain embodiments, the computing device 600 includes the client device 512 and/or the server 506 of FIG. 5. In some embodiments, the computing device 600 is configured to implement the method 100 of FIG. 1, the method 200 of FIG. 2, the method 300 of FIG. 3, and/or the method 400 of FIG. 4. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 604 is configured for executing instructions, such as instructions to implement the method 100 of FIG. 1, the method 200 of FIG. 2, the method 300 of FIG. 3, and/or the method 400 of FIG. 4. In some embodiments, the executable instructions are stored in the memory unit 606. In certain embodiments, the processing unit 604 includes one or more processing units (e.g., in a multi-core configuration). In some embodiments, the processing unit 604 includes and/or is communicatively coupled to one or more modules for implementing the methods and systems described in the present disclosure. In certain embodiments, the processing unit 604 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 606 includes a device allowing information, such as executable instructions and/or other data to be stored and retrieved. In some embodiments, the memory unit 606 includes one or more computer readable media. In certain embodiments, the memory unit 606 includes computer readable instructions for providing a user interface, such as to the user 616, via the output unit 610. In some embodiments, a user interface includes a web browser and/or a client application. For example, a web browser enables the user 616 to interact with media and/or other information embedded on a web page and/or a website. In certain embodiments, the memory unit 606 includes computer readable instructions for receiving and processing an input via the input unit 608. In some embodiments, the memory unit 606 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 608 is configured to receive input (e.g., from the user 616). In some embodiments, the input unit 608 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 608 is configured to function as both an input unit and an output unit.

In various embodiments, the output unit 610 includes a media output unit configured to present information to the user 616. In some embodiments, the output unit 610 includes any component capable of conveying information to the user 616. In certain embodiments, the output unit 610 includes an output adapter such as a video adapter and/or an audio adapter. For example, the output unit 610 is operatively coupled to the processing unit 604 and/or a visual display device to present information to the user 616 (e.g., a liquid crystal display (LCD), a light emitting diode (LED) display, an organic light emitting diode (OLED) display, a cathode ray tube (CRT) display, a projected display, etc.). As an example, the output unit 610 is operatively coupled to the processing unit 604 and/or an audio display device to present information to the user 616 (e.g., a speaker arrangement or headphones).

In various embodiments, the communication unit 612 is configured to be communicatively coupled to a remote device. In some embodiments, the communication unit 612 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 612 is configured to provide email integration for communicating data between a server and one or more clients.

In various embodiments, the storage unit 614 is configured to enable communication between the computing device 600 and the storage device 618. In some embodiments, the storage unit 614 is a storage interface. For example, the storage interface is any component capable of providing the processing unit 604 with access to the storage device 618. In certain embodiments, the storage unit 614 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 604 with access to the storage device 618.

In various embodiments, the storage device 618 includes any computer-operated hardware suitable for storing and/or retrieving data. In certain embodiments, the storage device 618 is integrated in the computing device 600. In some embodiments, the storage device 618 includes a database such as a local database or a cloud database. In certain embodiments, the storage device 618 includes one or more hard disk drives. In some embodiments, the storage device 618 is external and is configured to be accessed by a plurality of server systems. In certain embodiments, the storage device 618 includes multiple storage units such as hard disks or solid state disks in a redundant array of inexpensive disks configuration. In some embodiments, the storage device 618 includes a storage area network and/or a network attached storage system.

IV. Examples of Certain Embodiments of the Present Disclosure

According to certain embodiments, a method for validating whether or not a user of a mobile device is a driver of a vehicle includes receiving telematics data and device interaction data generated by the mobile device during a vehicle trip. Also, the method includes analyzing the telematics data and the device interaction data to determine a plurality of driving instances in which the user interacts with the mobile device during the vehicle trip. By using a classification technique, the method includes determining whether or not the user of the mobile device is the driver of the vehicle during the vehicle trip based at least in part upon the plurality of driving instances. Additionally, the method includes receiving positioning data associated with the mobile device within the vehicle during the vehicle trip. Moreover, the method includes validating the classification technique based at least in part upon the positioning data associated with the mobile device within the vehicle and whether or not the user of the mobile device is determined to be the driver of the vehicle. For example, the method is implemented according to at least FIG. 1.

According to some embodiments, a computing device for validating whether or not a user of a mobile device is a driver of a vehicle includes one or more processors and a memory storing instructions for execution by the one or more processors. The instructions, when executed, cause the one or more processors to receive telematics data and device interaction data generated by the mobile device during a vehicle trip. Also, the instructions, when executed, cause the one or more processors to analyze the telematics data and the device interaction data to determine a plurality of driving instances in which the user interacts with the mobile device during the vehicle trip. Additionally, the instructions, when executed, cause the one or more processors to use a classification technique to determine whether or not the user of the mobile device is the driver of the vehicle during the vehicle trip based at least in part upon the plurality of driving instances. Further, the instructions, when executed, cause the one or more processors to receive positioning data associated with the mobile device within the vehicle during the vehicle trip. Moreover, the instructions, when executed, cause the one or more processors to validate the classification technique based at least in part upon the positioning data associated with the mobile device within the vehicle and whether or not the user of the mobile device is determined to be the driver of the vehicle. For example, the computing device is implemented according to at least FIG. 5 and/or FIG. 6.

According to certain embodiments, a non-transitory computer-readable medium storing instructions for validating whether or not a user of a mobile device is a driver of a vehicle. The instructions are executed by one or more processors of a computing device. The non-transitory computer-readable medium includes instructions to receive telematics data and device interaction data generated by the mobile device during a vehicle trip. Also, the non-transitory computer-readable medium includes instructions to analyze the telematics data and the device interaction data to determine a plurality of driving instances in which the user interacts with the mobile device during the vehicle trip. Additionally, the non-transitory computer-readable medium includes instructions to use a classification technique to determine whether or not the user of the mobile device is the driver of the vehicle during the vehicle trip based at least in part upon the plurality of driving instances. Further, the non-transitory computer-readable medium includes instructions to receive positioning data associated with the mobile device within the vehicle during the vehicle trip. Moreover, the non-transitory computer-readable medium includes instructions to validate the classification technique based at least in part upon the positioning data associated with the mobile device within the vehicle and whether or not the user of the mobile device is determined to be the driver of the vehicle. For example, the non-transitory computer-readable medium is implemented according to at least FIG. 1, FIG. 5, and/or FIG. 6.

V. One or More Systems and Methods for Determining Whether a Driver or a Passenger is Using the Driver's Mobile Device According to Some Embodiments According to certain embodiments, a system and/or a method for determining whether a driver or a passenger is using a mobile device of the driver during a trip includes analyzing the telematics data and device interaction data generated by the mobile device to determine usage of the mobile device during high attention driving events. For example, the high attention driving events include events that require a high level of mental focus/energy such as changing lanes, making turns, overtaking/passing another vehicle, entering/exiting a highway ramp, transiting through a roundabout, etc. In some embodiments, a total number of high attention driving events is determined by analyzing the telematics data. In certain embodiments, the high attention driving events are correlated with the device interaction data to determine a number of high attention driving events involving user interactions with the mobile device. In some embodiments, a ratio indicating whether the driver is using the mobile device is calculated by comparing the number of high attention driving events involving user interactions with the mobile device to the total number of high attention driving events. In certain embodiments, the calculated ratio indicating whether the driver is using the mobile device is compared to a predefined threshold ratio (e.g., 25%). For example, if the calculated ratio is less than the threshold ratio, then the driver is determined to be using the mobile device during the trip. As an example, if the calculated ratio is greater than the threshold ratio, then the passenger is determined to be using the mobile device during the trip. According to various embodiments, the trip may be partitioned into a plurality of segments. For example, a ratio indicating whether the driver is using the mobile device is calculated for each of the plurality of segments and compared to the threshold ratio. As an example, an overall ratio indicating whether the driver is using the mobile device can be determined based upon analyzing the calculated ratios for the plurality of segments.

According to some embodiments, a system and/or a method for determining which vehicle occupant is using a mobile device of a driver during a vehicle trip includes collecting telematics data and device interaction data generated by the mobile device; analyzing the telematics data to determine a total number of high attention driving events; analyzing the telematics data and the device interaction data to determine a number of high attention driving events involving user interactions with the mobile device; calculating a ratio indicating whether the driver is using the mobile device by comparing the number of high attention driving events involving user interactions with the mobile device to the total number of high attention driving events; and/or comparing the calculated ratio indicating whether the driver is using the mobile device to a predefined threshold ratio. According to certain embodiments, the driver is determined to be using the mobile device if the calculated ratio is less than the threshold ratio, while the passenger is determined to be using the mobile device if the calculated ratio is greater than the threshold ratio.

According to certain embodiments, a system and/or a method for determining whether a driver or a passenger is using a mobile device of the driver during a trip includes analyzing the telematics data and device interaction data generated by the mobile device to determine usage of the mobile device during low attention driving events. For example, the low attention driving events include events that require a low level of mental focus/energy such as stopping, idling, cruising on a highway, driving in light traffic, etc. In some embodiments, a total number of user interactions with the mobile device is determined by analyzing the device interaction data. In certain embodiments, the low attention driving events are correlated with the device interaction data to determine a number of low attention driving events involving user interactions with the mobile device. In some embodiments, a ratio indicating whether the driver is using the mobile device is calculated by comparing the number of low attention driving events involving user interactions with the mobile device to the total number of user interactions with the mobile device. In certain embodiments, the calculated ratio indicating whether the driver is using the mobile device is compared to a predefined threshold ration (e.g., 75%). For example, if the calculated ratio is greater than the threshold ratio, then the driver is determined to be using the mobile device during the trip. As an example, if the calculated ratio less than the threshold ratio, then the passenger is determined to be using the mobile device during the trip. According to various embodiments, the trip may be partitioned into a plurality of segments. For example, a ratio indicating whether the driver is using the mobile device is calculated for each of the plurality of segments and compared to the threshold ratio. As an example, an overall ratio indicating whether the driver is using the mobile device can be determined based upon analyzing the calculated ratios for the plurality of segments.

According to some embodiments, a system and/or a method for determining which vehicle occupant is using a mobile device of a driver during a vehicle trip includes collecting telematics data and device interaction data generated by the mobile device; analyzing the device interaction data to determine a total number user interactions with the mobile device; analyzing the telematics data and the device interaction data to determine a number of low attention driving events involving user interactions with the mobile device; calculating a ratio indicating whether the driver is using the mobile device by comparing the number of low attention driving events involving user interactions with the mobile device to the total number of user interactions with the mobile device; and/or comparing the calculated ratio indicating whether the driver is using the mobile device to a predefined threshold ratio. According to certain embodiments, the driver is determined to be using the mobile device if the calculated ratio is greater than the threshold ratio, while the passenger is determined to be using the mobile device if the calculated ratio is less than the threshold ratio.

According to certain embodiments, a system and/or a method for determining whether a driver or a passenger is using a mobile device of the driver during a trip includes utilizing unsupervised machine learning with manual feature extraction. In some embodiments, the telematics data and device interaction data generated by the mobile device are analyzed to determine a plurality of driving instances involving user interactions with the mobile device. As an example, for each driving instance, a time window is created that includes a time period preceding the driving instance and a time period following the driving instance. In various embodiments, one or more driving features (e.g., making turns, entering/exiting an intersection, speed, etc.) are manually extracted for each window. For example, the one or more driving features are manually determined upon analysis of the telematics data. In certain embodiments, different weights are assigned to each of the one or more driving features to denote a relative importance of each of the one or more driving features. In some embodiments, the one or more driving features are normalized and/or scaled before being assigned with weights. According to various embodiments, a clustering/classification technique (e.g., k-means algorithm) is applied to all the windows to determine which one of the plurality of driving instances is associated with the driver and which one of the plurality of driving instances is associated with the passenger. In certain embodiments, data from multiple trips are analyzed by using unsupervised machine learning with manual feature extraction.

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device; processing each of the plurality of driving instances involving user interactions with the mobile device to determine one or more driving features associated with each of the plurality of driving instances involving user interactions with the mobile device; and/or applying a clustering technique to the one or more driving features to classify which one of the plurality of driving instances is associated with the driver and which one of the plurality of driving instances is associated with a passenger.

According to certain embodiments, a system and/or a method for determining whether a driver or a passenger is using a mobile device of the driver during a trip includes utilizing unsupervised machine learning with automatic feature extraction. In some embodiments, the telematics data and device interaction data generated by the mobile device are analyzed to determine a plurality of driving instances involving user interactions with the mobile device. In various embodiments, each of the plurality of driving instances is processed using a model (e.g., a machine learning model such as an artificial neural network) to determine a feature vector associated with each of the plurality of driving instances. In certain embodiments, the machine learning model has been trained to automatically extract or determine the feature vector. According to various embodiments, a clustering/classification technique (e.g., k-means algorithm) is applied to all the feature vectors determine which one of the plurality of driving instances is associated with the driver and which one of the plurality of driving instances is associated with the passenger. In certain embodiments, data from multiple trips are analyzed by using unsupervised machine learning with automatic feature extraction.

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device; processing each of the plurality of driving instances with a trained machine learning model to determine a feature vector associated with each of the plurality of driving instances involving user interactions with the mobile device; and/or applying a clustering technique to each feature vector to determine which one of the plurality of driving instances is associated with the driver and which one of the plurality of driving instances is associated with a passenger.

According to certain embodiments, a system and/or a method for determining whether a driver or a passenger is using a mobile device of the driver during a trip includes utilizing supervised machine learning. In some embodiments, the telematics data and device interaction data generated by the mobile device are analyzed to determine a plurality of driving instances involving user interactions with the mobile device. For example, each of the plurality of driving instances is labeled to indicate that each instance is either associated with the driver or the passenger. According to various embodiments, the plurality of driving instances is processed by a model (e.g., a machine learning model such as an artificial neural network) to train the model to recognize the association of each instance with either the driver or the passenger. For example, training is complete when a loss/cost function associated with the plurality of driving instances is sufficiently reduced (e.g., minimized).

According to some embodiments, a system and/or a method for determining which vehicle occupant is using a mobile device of a driver during a vehicle trip includes collecting telematics data and device interaction data generated by the mobile device; analyzing the telematics data and the device interaction data to a plurality of driving instances involving user interactions with the mobile device, where each of the plurality of driving instances indicates whether the instance is associated with the driver or the passenger; and/or processing the plurality of driving instances with a machine learning model to train the machine learning model to recognize the association of each instance with either the driver or a passenger.

According to certain embodiments, a system and/or a method for validating whether a driver or a passenger is using a mobile device of the driver in view of multiple mobile devices within a vehicle during a trip includes analyzing the telematics data and device interaction data generated by a first mobile device and a second mobile device in the vehicle to determine whether a user of the first mobile device is the driver/passenger and whether a user of the second mobile device is the driver/passenger. In various embodiments, a classification technique is used to determine which user is the driver or passenger in the vehicle by classifying each driving instance involving user interactions associated with the first mobile device and the second mobile device. For example, the classification technique may be based upon analyzing usage of the mobile devices during high attention driving events and/or low attention driving events. As an example, the classification technique may be based upon unsupervised and/or supervised machine learning. In some embodiments, the classification technique is validated when the role of the user of the first mobile device and the role of the user of the second mobile device have been determined to be different. For example, with two mobile devices in the vehicle, only the activity of one of the mobile devices can be attributed to the driver. As an example, it is impossible to have the activity of both mobile devices being attributed the driver.

According to some embodiments, a system and/or a method for validating which vehicle occupant is using a mobile device of a driver in view of multiple mobile devices within a vehicle includes collecting respective telematics data and device interaction data generated by a first mobile device and a second mobile device in the vehicle; analyzing the telematics data and the device interaction data from the first mobile device to determine a first plurality of driving instances involving user interactions with the first mobile device; analyzing the telematics data and the device interaction data from the second mobile device to determine a second plurality of driving instances involving user interactions with the second mobile device; processing the first plurality of driving instances involving user interactions with the first mobile device by using a classification technique to determine whether a user of the first mobile device is the driver or a passenger in the vehicle; processing the second plurality of driving instances involving user interactions with the second mobile device by using the classification technique to determine whether a user of the second mobile device is the driver or the passenger in the vehicle; and/or validating the classification technique when the user of the first mobile device and the user for the second mobile device have been determined to be different.

According to certain embodiments, a system and/or a method for validating whether a driver or a passenger is using a mobile device of the driver in view of mobile device positions within a vehicle during a trip includes using a classification technique to classify each driving instance involving user interactions with the mobile device as being associated with either the driver or the passenger. For example, the classification technique may be based upon analyzing mobile device usage during high attention driving events and/or low attention driving events. As an example, the classification technique may be based upon unsupervised and/or supervised machine learning. In various embodiments, the classification technique is tested with positioning data of the mobile device within the vehicle to determine the validity of the classification technique. For example, if the mobile device is positioned in a rear seat of the vehicle, then it is impossible to attribute the activity of the mobile device to the driver.

According to some embodiments, a system and/or a method for validating which vehicle occupant is using a mobile device of a driver in view of mobile device positions within a vehicle includes collecting telematics data and device interaction data generated by the mobile device; analyzing the telematics data and the device interaction data to a plurality of driving instances involving user interactions with the mobile device; processing the plurality of driving instances involving user interactions with the mobile device by using a classification technique; and/or validating the classification technique with positioning data of mobile device within the vehicle.

VI. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VII. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A system comprising one or more processors and one or more non-transitory computer-readable media storing computing instructions that, when executed on the one or more processors, cause the one or more processors to perform operations comprising:
    analyzing telematics data and device interaction data to determine vehicle driving instances in which a user interacts with a mobile device during a vehicle trip for a vehicle, wherein:
        the telematics data is generated during the vehicle trip for the vehicle; and
        the device interaction data is generated when the user interacts with the mobile device during the vehicle trip for the vehicle;
    receiving positioning data associated with one or more positions of the mobile device within the vehicle during the vehicle trip for the vehicle; and
    identifying whether the user interacting with the mobile device is a driver of the vehicle based at least in part upon the positioning data and the vehicle driving instances.

2. The system of claim 1, wherein identifying whether the user interacting with the mobile device is the driver of the vehicle further comprises:
    determining if the user interacting with the mobile device is located in a driver seat position of the vehicle during the vehicle trip.

3. The system of claim 2, wherein:
    the mobile device is a first mobile device; and
    identifying whether the user interacting with the mobile device is the driver of the vehicle further comprises:
        receiving first positioning measurements captured by the first mobile device during the vehicle trip;
        receiving second positioning measurements captured by a second mobile device within the vehicle during the vehicle trip;
        calculating respective enhanced geographic location measurements for the first positioning measurements and the second positioning measurements;
        determining a predicted position of the first mobile device relative to the second mobile device with respect to a forward direction of travel of the vehicle during the vehicle trip based at least in part upon the respective enhanced geographic location measurements; and
        identifying that the first mobile device is associated with the driver of the vehicle based at least in part upon the predicted-position of the first mobile device relative to the second mobile device.

4. The system of claim 3, wherein the computing instructions, when executed on the one or more processors, further cause the one or more processors to perform an operation comprising:
    generating a map indicating a position of the first mobile device with respect to the second mobile device within the vehicle based at least in part upon the predicted position of the first mobile device relative to the second mobile device.

5. The system of claim 4, wherein the computing instructions, when executed on the one or more processors, further cause the one or more processors to perform an operation comprising:

analyzing the map to determine that the user interacting with the first mobile device is located in the driver seat position of the vehicle during the vehicle trip.

6. The system of claim 1, wherein identifying whether the user of the mobile device is the driver of the vehicle further comprises at least one of:
   if the user interacting with the mobile device is determined to be the driver of the vehicle, verifying that the user interacting with the mobile device is located in a driver seat position of the vehicle during the vehicle trip; or
   if the user interacting with the mobile device is determined not to be the driver of the vehicle, verifying that the user interacting with the mobile device is not located in the driver seat position of the vehicle during the vehicle trip.

7. The system of claim 1, wherein the telematics data is generated by the mobile device.

8. A computer-implemented method being implemented via execution of computing instructions configured to run at one or more processors and stored at one or more non-transitory computer-readable media for validating whether or not a user of a mobile device is a driver of a vehicle comprising:
   analyzing telematics data and device interaction data to determine vehicle driving instances in which the user interacts with the mobile device during a vehicle trip for the vehicle, wherein:
      the telematics data is generated during the vehicle trip for the vehicle; and
      the device interaction data is generated when the user interacts with the mobile device during the vehicle trip for the vehicle;
   receiving positioning data associated with one or more positions of the mobile device within the vehicle during the vehicle trip for the vehicle; and
   identifying whether the user interacting with the mobile device is the driver of the vehicle based at least in part upon the positioning data and the vehicle driving instances.

9. The computer-implemented method of claim 8, wherein identifying whether the user interacting the mobile device is the driver of the vehicle further comprises:
   determining if the user interacting with the mobile device is located in a driver seat position of the vehicle during the vehicle trip.

10. The computer-implemented method of claim 9, wherein:
   the mobile device is a first mobile device; and
   identifying whether the user interacting with the mobile device is the driver of the vehicle further comprises:
      receiving first positioning measurements captured by the first mobile device during the vehicle trip;
      receiving second positioning measurements captured by a second mobile device within the vehicle during the vehicle trip;
      calculating respective enhanced geographic location measurements for the first positioning measurements and the second positioning measurements;
      determining a predicted position of the first mobile device relative to the second mobile device with respect to a forward direction of travel of the vehicle during the vehicle trip based at least in part upon the respective enhanced geographic location measurements; and
      identifying that the first mobile device is associated with the driver of the vehicle based at least in part upon the predicted position of the first mobile device relative to the second mobile device.

11. The computer-implemented method of claim 10 further comprising:
   generating a map indicating a position of the first mobile device with respect to the second mobile device within the vehicle based at least in part upon the predicted position of the first mobile device relative to the second mobile device.

12. The computer-implemented method of claim 11 further comprising:
   analyzing the map to determine that the user interacting with the first mobile device o is located in the driver seat position of the vehicle during the vehicle trip.

13. The computer-implemented method of claim 8, wherein identifying whether the user of the mobile device is the driver of the vehicle further comprises at least one of:
   if the user interacting with the mobile device is determined to be the driver of the vehicle, verifying that the user interacting with the mobile device is located in a driver seat position of the vehicle during the vehicle trip; or
   if the user interacting with the mobile device is determined not to be the driver of the vehicle, verifying that the user interacting with the mobile device is not located in the driver seat position of the vehicle during the vehicle trip.

14. The computer-implemented method of claim 8, wherein the telematics data is generated by the mobile device.

15. One or more non-transitory computer-readable media storing computing instructions that, when executed by one or more processors, cause the one or more processors to perform operations comprising:
   analyzing telematics data and device interaction data to determine vehicle driving instances in which a user interacts with a mobile device during a vehicle trip for a vehicle, wherein:
      the telematics data is generated during the vehicle trip for the vehicle; and
      the device interaction data is generated when the user interacts with the mobile device during the vehicle trip for the vehicle;
   receiving positioning data associated with one or more positions of the mobile device within the vehicle during the vehicle trip for the vehicle; and
   identifying whether the user interacting with the mobile device is a driver of the vehicle based at least in part upon the positioning data and the vehicle driving instances.

16. The one or more non-transitory computer-readable media of claim 15, wherein identifying whether the user interacting with the mobile device is the driver of the vehicle further comprises:
   determining if the user interacting with the mobile device is located in a driver seat position of the vehicle during the vehicle trip.

17. The one or more non-transitory computer-readable media of claim 16, wherein:
   the mobile device is a first mobile device; and
   identifying whether the user interacting with the mobile device is the driver of the vehicle further comprises:
      receiving first positioning measurements captured by the first mobile device during the vehicle trip;
      receiving second positioning measurements captured by a second mobile device within the vehicle during the vehicle trip;

calculating respective enhanced geographic location measurements for the first positioning measurements and the second positioning measurements;

determining a predicted position of the first mobile device relative to the second mobile device with respect to a forward direction of travel of the vehicle during the vehicle trip based at least in part upon the respective enhanced geographic location measurements; and identifying that the first mobile device is associated with the driver of the vehicle based at least in part upon the predicted position of the first mobile device relative to the second mobile device.

18. The one or more non-transitory computer-readable media of claim 17, wherein the computing instructions, when executed on the one or more processors, further cause the one or more processors to perform an operation comprising:

generating a map indicating a position of the first mobile device with respect to the second mobile device within the vehicle based at least in part upon the predicted position of the first mobile device relative to the second mobile device.

19. The one or more non-transitory computer-readable media of claim 18, wherein the computing instructions, when executed on the one or more processors, further cause the one or more processors to perform an operation comprising:

analyzing the map to determine that the user interacting with the first mobile device or the user of the first mobile device is located in the driver seat position of the vehicle during the vehicle trip.

20. The one or more non-transitory computer-readable media of claim 15, wherein identifying whether the user of the mobile device is the driver of the vehicle further comprises at least one of:

if the user interacting with the mobile device is determined to be the driver of the vehicle, verifying that the user interacting with the mobile device is located in a driver seat position of the vehicle during the vehicle trip; or if the user interacting with the mobile device is determined not to be the driver of the vehicle, verifying that the user interacting with the mobile device is not located in the driver seat position of the vehicle during the vehicle trip.

21. A system comprising:

a means for:

analyzing telematics data and device interaction data to determine vehicle driving instances in which a user interacts with a mobile device during a vehicle trip for a vehicle, wherein:

the telematics data is generated during the vehicle trip for the vehicle; and the device interaction data is generated when the user interacts with the mobile device during the vehicle trip for the vehicle;

receiving positioning data associated with one or more positions of the mobile device within the vehicle during the vehicle trip for the vehicle; and identifying whether the user interacting with the mobile device is a driver of the vehicle based at least in part upon the positioning data and the vehicle driving instances.

* * * * *